United States Patent
Lee et al.

(10) Patent No.: US 10,679,357 B2
(45) Date of Patent: Jun. 9, 2020

(54) IMAGE-BASED OBJECT TRACKING SYSTEMS AND METHODS

(71) Applicant: Quanta Computer Inc., Taoyuan (TW)

(72) Inventors: Chen-Chung Lee, Taoyuan (TW);
Chia-Hung Lin, Taoyuan (TW);
Ming-Jen Chen, Taoyuan (TW);
Ching-Wen Lin, Taoyuan (TW);
Wei-Lun Tsai, Taoyuan (TW); Jui-Sen Tuan, Taoyuan (TW); You-Dian Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 99 days.

(21) Appl. No.: 16/170,307

(22) Filed: Oct. 25, 2018

(65) Prior Publication Data

US 2020/0020110 A1 Jan. 16, 2020

(30) Foreign Application Priority Data

Jul. 12, 2018 (TW) .............................. 107124085 A

(51) Int. Cl.
*G06K 9/00* (2006.01)
*G06T 7/20* (2017.01)

(52) U.S. Cl.
CPC ...... *G06T 7/20* (2013.01); *G06T 2207/20212* (2013.01); *G06T 2207/30242* (2013.01)

(58) Field of Classification Search
CPC . G01S 13/931; G01S 2013/932; H04N 9/735; G06F 16/24575; G06F 16/248;
(Continued)

(56) References Cited

U.S. PATENT DOCUMENTS 6,928,314 B1 *  8/2005 Johnson .................. G06T 15/08
                                                        128/920
8,433,444 B2 *  4/2013 Lee ....................... G02B 7/1827
                                                          396/2
(Continued)

FOREIGN PATENT DOCUMENTS

CN          106560838 A       4/2017

OTHER PUBLICATIONS

Chinese language Office Action dated Dec. 19, 2019, issued in application No. TW 107124085.

*Primary Examiner* — Charlotte M Baker
(74) *Attorney, Agent, or Firm* — McClure, Qualey & Rodack, LLP

(57) ABSTRACT

An image-based object tracking system including a photographic device and a computing equipment is provided. The photographic device captures a first image of a scene at a first time and a second image of the scene at a second time subsequent to the first time. The computing equipment determines an area of the scene in the first and second images, which includes a midline of the scene in the first and second images, overlaps the first and second images for determining whether a distance between a first object in the first image and a second object in the second image is less than a predetermined threshold in response to the first object being in the area and the second object not being in the area, and updates an entry object count or an exit object count in response to the distance being less than the predetermined threshold.

10 Claims, 7 Drawing Sheets

(58) Field of Classification Search
CPC .. G06F 3/0485; G06F 3/04883; G06F 3/0488; G06F 9/451; G06T 2207/20212; G06T 2207/30242; G06T 7/20; A61F 13/44
USPC ......... 382/103, 128; 715/233, 230; 700/275; 396/2; 600/407; 128/920; 348/47
See application file for complete search history.

(56) References Cited

U.S. PATENT DOCUMENTS

| | | | | |
|---|---|---|---|---|
| 8,724,851 | B2* | 5/2014 | Mellor | G06T 7/246 |
| | | | | 382/103 |
| 9,179,881 | B2* | 11/2015 | Menon Gopalakrishna | |
| | | | | A61B 6/463 |
| 9,524,282 | B2* | 12/2016 | Algreatly | G11B 27/28 |
| 10,438,060 | B2 | 10/2019 | Liu | |
| 2015/0245016 | A1* | 8/2015 | Atac | G02B 30/26 |
| | | | | 348/47 |

* cited by examiner

US 10,679,357 B2

IMAGE-BASED OBJECT TRACKING SYSTEMS AND METHODS

CROSS REFERENCE TO RELATED APPLICATIONS

This Application claims priority of Taiwan Application No. 107124085, filed on Jul. 12, 2018, the entirety of which is incorporated by reference herein.

BACKGROUND OF THE APPLICATION

Field of the Application

The application relates generally to image processing techniques, and more particularly, to image-based object tracking systems and methods.

Description of the Related Art

Tracking objects, such as people or vehicles, coming in and out of particular spaces is always an important issue in operation management and security management. In a shopping mall, for example, tracking the number of customers may help market planning and staff deployment, and tracking the number of staff members may aid in personnel management. In addition, object tracking for spaces, such as buildings, roads, and public transportation centers, may improve traffic control and facility management.

In general, object tracking is realized by using gate counters, infrared sensors, or image processing techniques to detect objects coming in and out of spaces. Conventionally, object tracking using image processing techniques may install a camera above the entrance/exit of a space to capture the top-view images of the entrance/exit and use the upper or lower edge of the images as the basis for counting the number of entries or exits of objects to or from the space. However, the conventional way of object tracking using image processing techniques may suffer from serious miscount of the number of entries or exits when there are multiple objects coming in and out of the space at the same time.

FIG. 1 is a schematic diagram illustrating the miscount problem suffered by the conventional design of image-based object tracking. As shown in FIG. 1, the upper edge of the image is used as the basis for counting the number of entries of objects to the space, and the lower edge of the image is used as the basis for counting the number of exits of objects from the space. That is, it is assumed that the space under access control is located above the scene of the image. Specifically, as time progresses from t1 to t2, the object O1 moves across the upper edge from the inside of the image, wherein the camera cannot capture the image of the object O1 in time t2. Meanwhile, the object O2 moves across the upper edge from the outside of the image. It is noted that, if the distance (denoted as d in FIG. 1) between the object O1 in time t1 and the object O2 in time t2 is less than a predetermined threshold D, the object O2 in time t2 and the object O1 in t1 would be identified as the same object moving towards the left. Consequently, the counted number of entries will not be increased as it should be, which results in a miscount.

BRIEF SUMMARY OF THE APPLICATION

In order to solve the aforementioned problem, the present application proposes image-based object tracking systems and methods, in which an area including the midline of the scene in the images is used as the basis for counting the number of entries and exits of objects, thereby avoiding miscounts.

In one aspect of the application, an image-based object tracking system comprising a photographic device and a computing equipment is provided. The photographic device is configured to capture a first image of a scene at a first time and a second image of the scene at a second time subsequent to the first time. The computing equipment is configured to determine an area of the scene in the first image and the second image, which comprises a midline of the scene in the first image and the second image, overlap the first image and the second image for determining whether a distance between a first object in the first image and a second object in the second image is less than a predetermined threshold in response to the first object being in the area and the second object not being in the area, and update an entry object count or an exit object count in response to the distance being less than the predetermined threshold.

In another aspect of the application, an image-based object tracking method, executed by an image object tracking system comprising a photographic device, is provided. The image-based object tracking method comprises the steps of: capturing a first image of a scene at a first time and a second image of the scene at a second time subsequent to the first time via the photographic device; determining an area of the scene in the first image and the second image, which comprises a midline of the scene in the first image and the second image; overlapping the first image and the second image for determining whether a distance between a first object in the first image and a second object in the second image is less than a predetermined threshold in response to the first object being in the area and the second object not being in the area; and updating an entry object count or an exit object count in response to the distance being less than the predetermined threshold.

Other aspects and features of the application will become apparent to those with ordinary skill in the art upon review of the following descriptions of specific embodiments of the image-based object tracking systems and methods.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
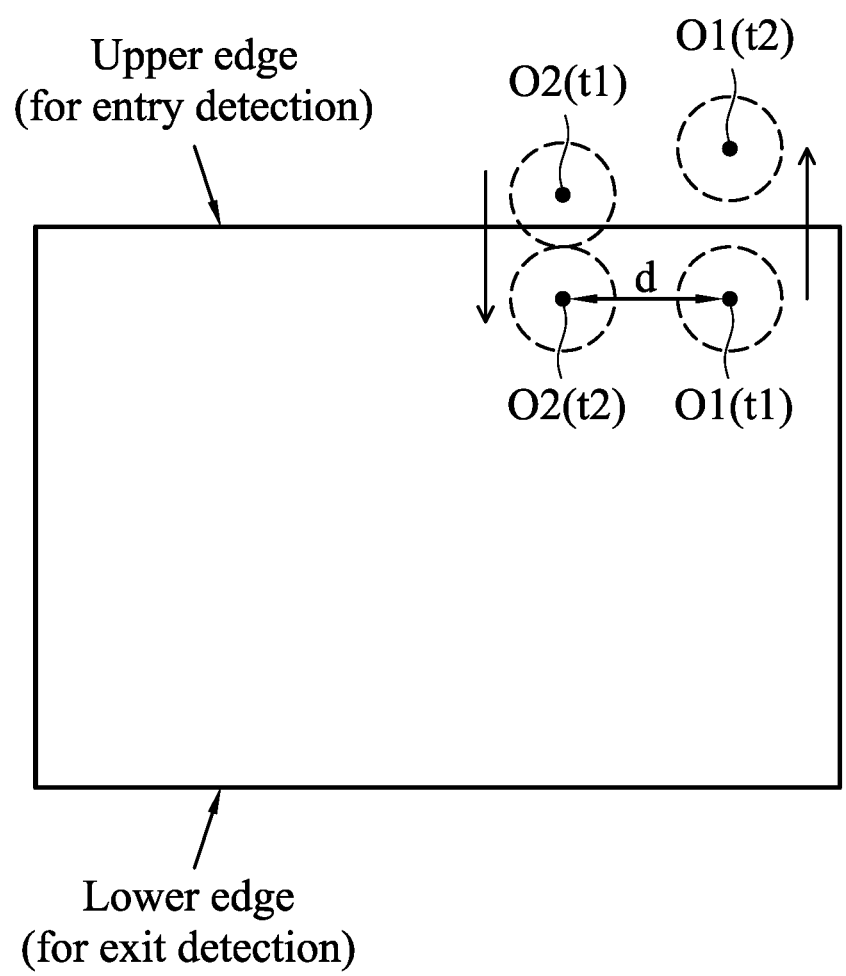
FIG. 1 is a schematic diagram illustrating the miscount problem suffered by the conventional design of image-based object tracking.
Figure 2:
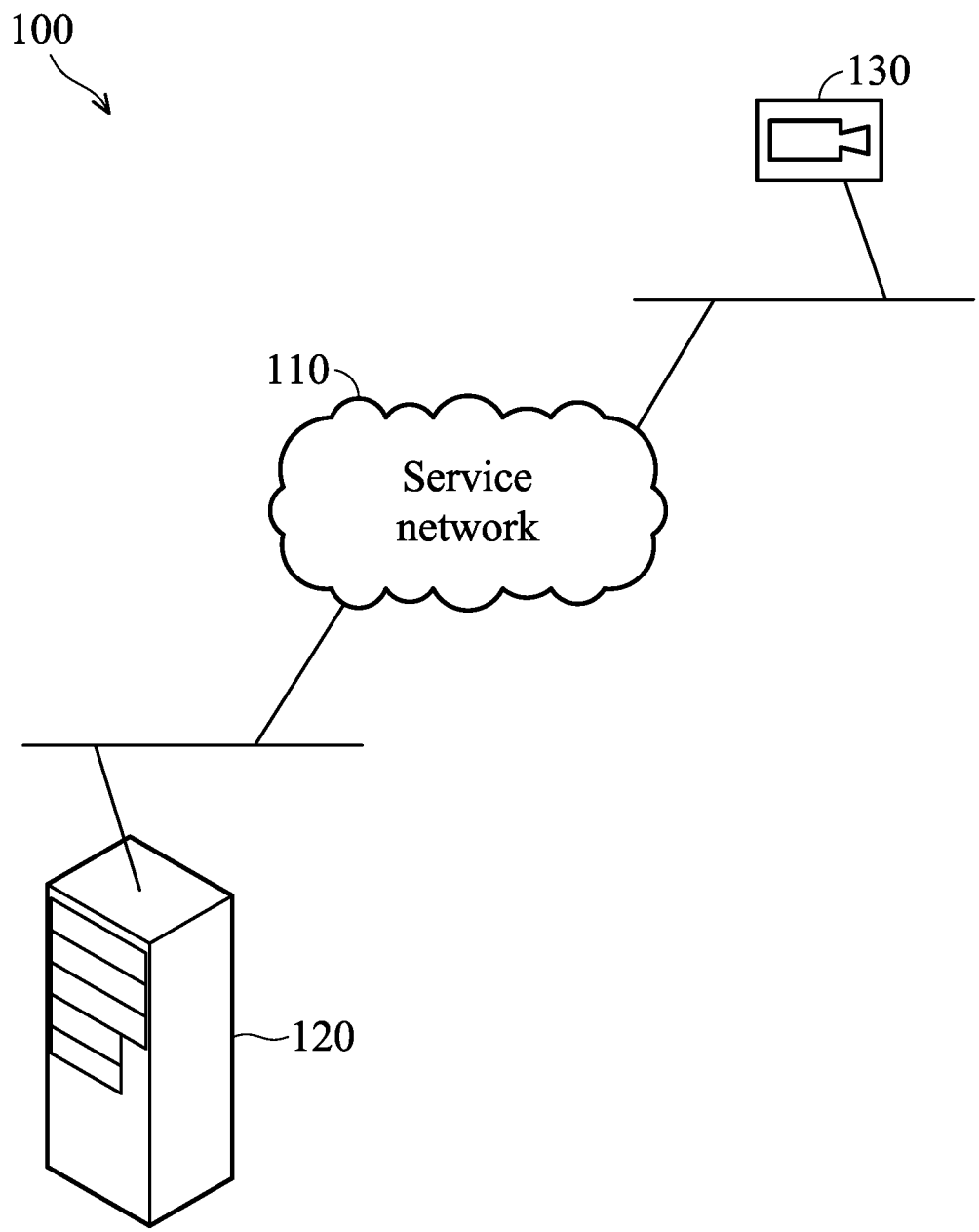
FIG. 2 is a block diagram illustrating an image-based object tracking system according to an embodiment of the application.

FIG. 2 is a block diagram illustrating an image-based object tracking system according to an embodiment of the application. The image-based object tracking system 100 includes a service network 110, a computing equipment 120, and a photographic device 130.

The service network 110 may consist of at least a wired network and/or at least a wireless network, and is responsible for providing connections between the computing equipment 120 and the photographic device 130. The wired network may include an Ethernet, an Asymmetric Digital Subscriber Line (ADSL), an optical network, a twisted-pair network, or a coaxial cable network, etc. The wireless network may include a telecommunication network or a Wireless Local Area Network (WLAN), wherein the telecommunication network may cover a larger geographical area, spanning from tens of miles to thousands of miles, and may form an international network across districts, cities, or countries. On the other hand, the WLAN generally covers a more local area, such as an office, or a floor in a building.

For example, the telecommunication network may include a Global System for Mobile communications (GSM) network, a General Packet Radio Service (GPRS) network, an Enhanced Data rates for Global Evolution (EDGE) network, a Wideband Code Division Multiple Access (WCDMA) network, a Code Division Multiple Access 2000 (CDMA-2000) network, a Time Division-Synchronous Code Division Multiple Access (TD-SCDMA) network, a Worldwide Interoperability for Microwave Access (WiMAX) network, a Long Term Evolution (LTE) network, a Time-Division LTE (TD-LTE) network, or an LTE-Advanced (LTE-A) network, etc.

The WLAN may be established using the Wireless-Fidelity (Wi-Fi) technology, the Bluetooth technology, the Zigbee technology, or another Short Range Wireless (SRW) technology.

The computing equipment 120 may be a panel Personal Computer (PC), a laptop computer, a server, or any computing device supporting at least one of the functions of network communication and image processing. Specifically, the computing equipment 120 is configured to connect to the photographic device 130 via the service network 110 for receiving image data, and perform object tracking by processing the image data.

The photographic device 130 is an electronic apparatus supporting the functions of network communication and image acquisition. Specifically, the photographic device 130 is responsible for capturing images and sending image data to the computing equipment 120 via the service network 110. In one embodiment, the photographic device 130 may be disposed above the entrance/exit of a space to capture the top-view images of the entrance/exit.

It should be understood that, although the image-based object tracking system 100 in FIG. 2 is a distributed system architecture, the image-based object tracking systems and methods may also be applied to a centralized system architecture. That is, the computing equipment 120 and the photographic device 130 may be incorporated into a single device, and the service network 110 may be omitted since network connections between the computing equipment 120 and the photographic device 130 are not necessary.

Figure 3:
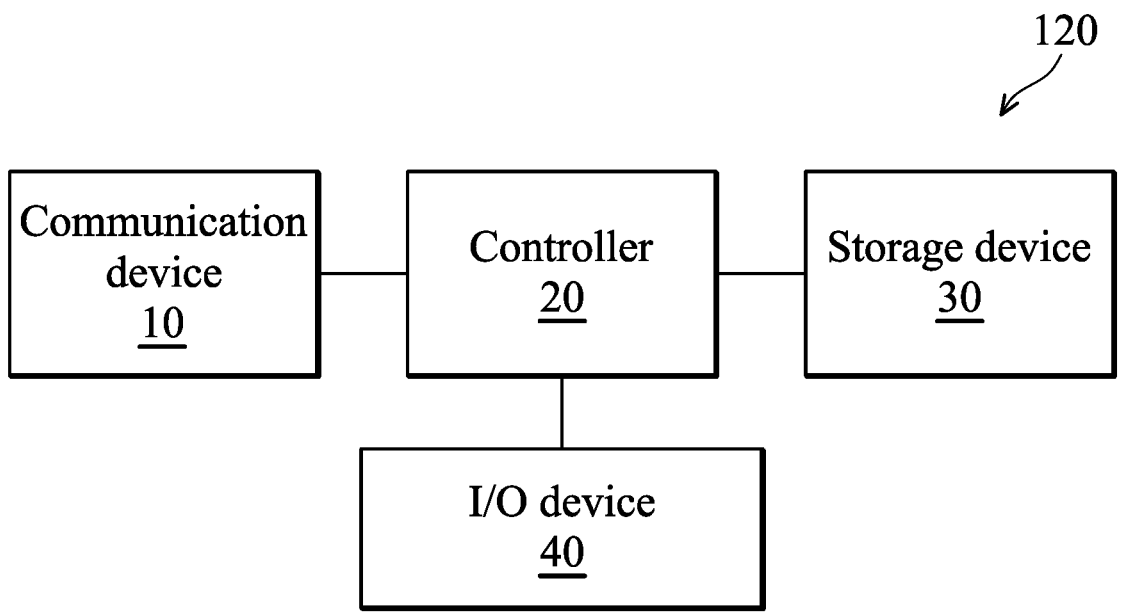
FIG. 3 is a block diagram illustrating the hardware architecture of the computing equipment 120 according to an embodiment of the application.

FIG. 3 is a block diagram illustrating the hardware architecture of the computing equipment 120 according to an embodiment of the application. As shown in FIG. 3, the computing equipment 120 includes a communication device 10, a controller 20, a storage device 30, and an Input/Output (I/O) device 40.

The communication device 10 is responsible for providing network connections to the service network 110, and then to the photographic device 130 through the service network 110. The communication device 10 may provide wired connections using an Ethernet, an optical network, an ADSL network, a twisted-pair network, or a coaxial cable network, etc. Alternatively, the communication device 10 may provide wireless connections using the Wi-Fi technology, the Bluetooth technology, the Zigbee technology, or any telecommunication technology.

The controller 20 may be a general-purpose processor, Micro-Control Unit (MCU), Application Processor (AP), Digital Signal Processor (DSP), Graphics Processing Unit (GPU), or any combination thereof, which includes various circuits for providing the function of data (e.g., image data) processing/computing, controlling the communication device 10 for connection provision, receiving image data from the photographic device 130 via the communication device 10, storing and retrieving data to and from the storage device 30, and outputting or receiving signals via the I/O device 40. In particular, the controller 20 may coordinate the communication device 10, the storage device 30, and the I/O device 40 for performing the image-based object tracking method of the present application.

The storage device 30 is a non-transitory computer-readable storage medium, including a memory, such as a FLASH memory or a Random Access Memory (RAM), or a magnetic storage device, such as a hard disk or a magnetic tape, or an optical disc, or any combination thereof for storing image data, and instructions or program code of communication protocols, applications, and/or the image-based object tracking method.

The I/O device 40 may include one or more buttons, a keyboard, a mouse, a touch pad, a video camera, a microphone, a speaker, and/or a display device (e.g., a Liquid-Crystal Display (LCD), Light-Emitting Diode (LED) display, or Electronic Paper Display (EPD)), etc., serving as the Man-Machine Interface (MMI) for user interactions. For example, the I/O device 40 may display the images captured by the photographic device 130, and/or display or output the entry object count, the exit object count, and the remaining object count.

It should be understood that the components described in the embodiment of FIG. 3 are for illustrative purposes only and are not intended to limit the scope of the application. For example, the computing equipment 120 may include additional components, such as a power supply.

Figure 4:
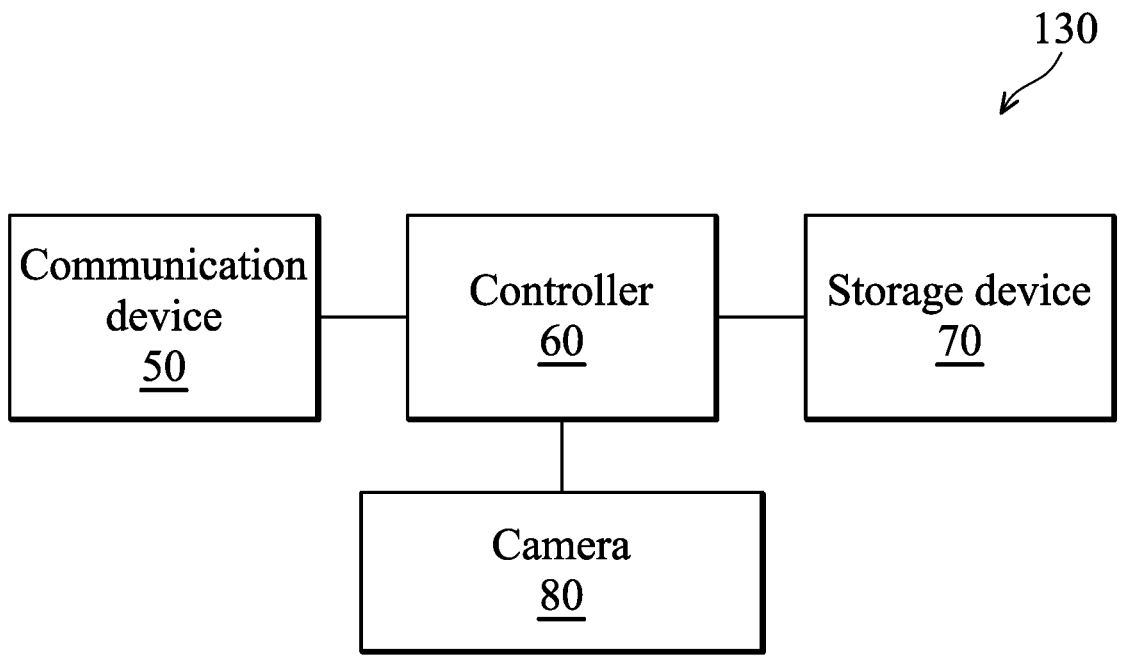
FIG. 4 is a block diagram illustrating a hardware architecture of the photographic device 130 according to an embodiment of the application.

FIG. 4 is a block diagram illustrating a hardware architecture of the photographic device 130 according to an embodiment of the application. As shown in FIG. 4, the photographic device 130 includes a communication device 50, a controller 60, a storage device 70, and a camera 80.

The function of the communication device 50 is similar to that of the communication device 10. Specifically, the communication device 50 is responsible for providing network connections to the service network 110, and then to the computing equipment 120 through the service network 110.

The controller 60 may be a general-purpose processor, MCU, AP, DSP, GPU, or any combination thereof, which includes various circuits for providing the function of controlling the camera 80 for image acquisition, receiving image data from the camera 80, storing and retrieving data to and from the storage device 70, and sending image data to the computing equipment 120 via the communication device 50.

The function of the storage device 70 is similar to that of the storage device 30. Specifically, the storage device 70 is used for storing image data, and instructions or program code of communication protocols and/or applications.

The camera 80 is responsible for capturing images with a fixed Field Of View (FOV). For example, the camera 80 may be disposed above the entrance/exit of a space, for capturing the top-view images of the entrance/exit. The camera 80 may include one or more optics, such as see-through lens, and/or image sensors.

It should be understood that the components described in the embodiment of FIG. 4 are for illustrative purposes only and are not intended to limit the scope of the application. For example, the photographic device 130 may include additional components, such as a power supply.

Figure 5:
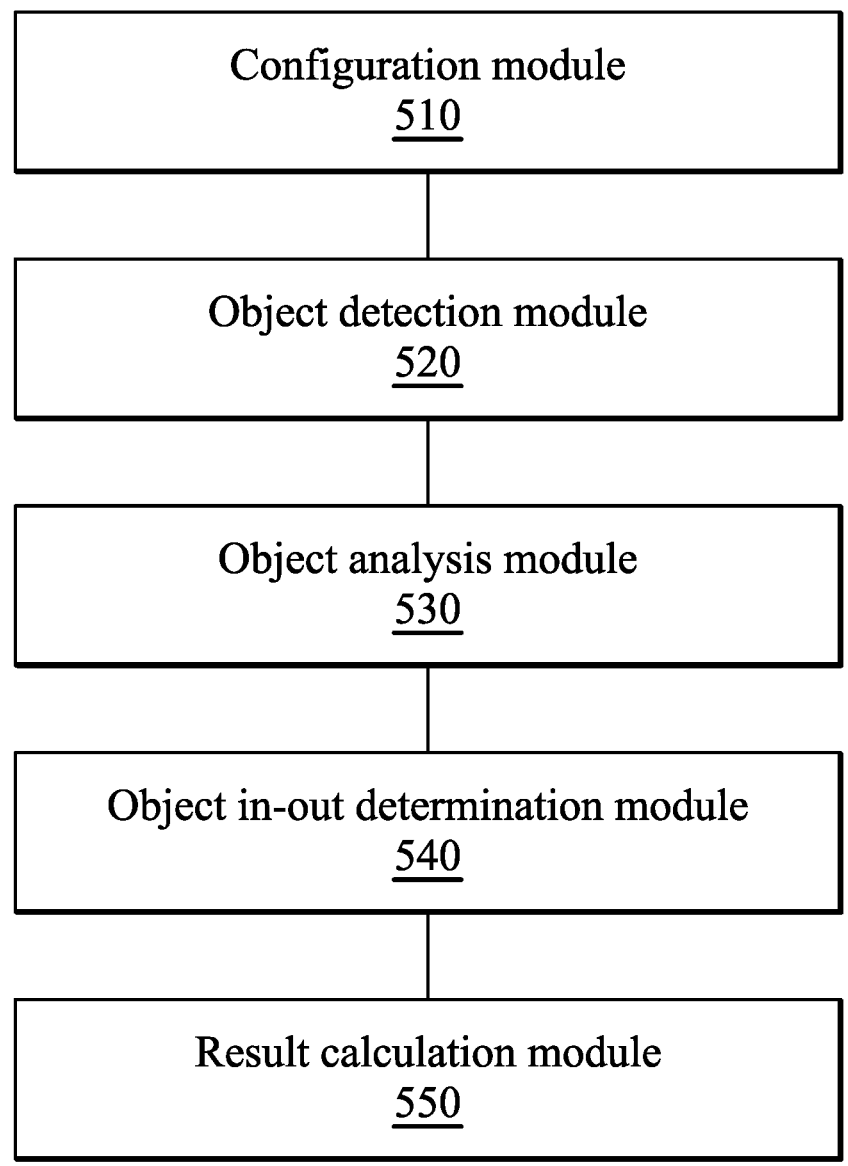
FIG. 5 is a block diagram illustrating a software architecture of the image-based object tracking method according to an embodiment of the application.

FIG. 5 is a block diagram illustrating a software architecture of the image-based object tracking method according to an embodiment of the application. In this embodiment, the software architecture includes a configuration module 510, an object detection module 520, an object analysis module 530, an object in-out determination module 540, and a result calculation module 550. The software modules may be realized in program code which, when executed by the computing equipment 120 of the image-based object tracking system 100, enables the computing equipment 120 to perform the image-based object tracking method.

Figure 6A:
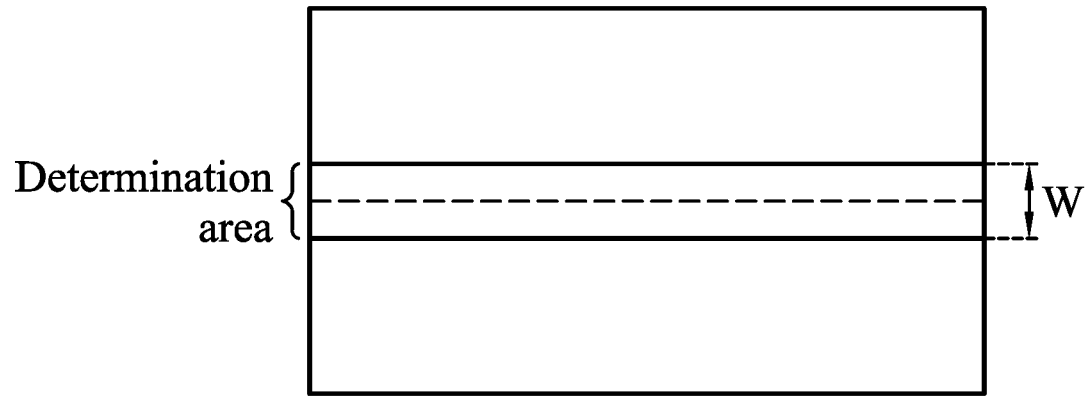
FIG. 6A is a schematic diagram illustrating the determination area according to an embodiment of the application.
Figure 6B:
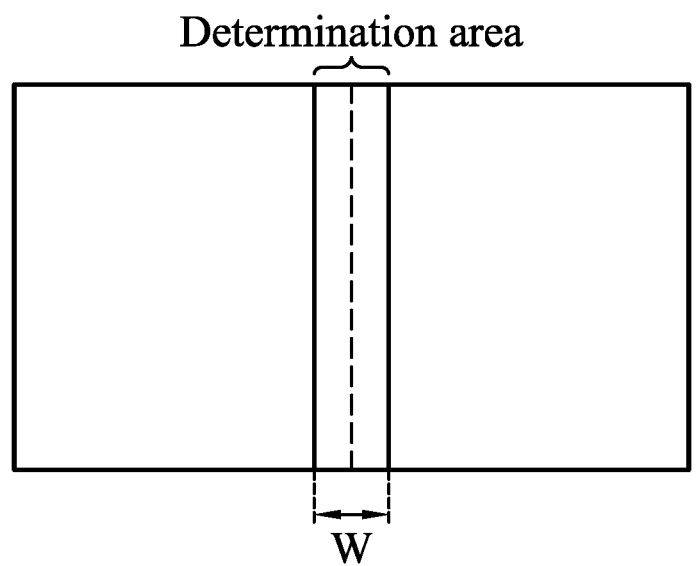
FIG. 6B is a schematic diagram illustrating the determination area according to another embodiment of the application.

The configuration module 510 is responsible for providing an interface for the image-based object tracking system 100 to receive configuration parameters for the configuration of object tracking from the manager or user of the image-based object tracking system 100, wherein the configuration parameters may include the height or width (denoted as W) of the determination area, and the predetermined threshold (denoted as D) for determining whether two objects at different times correspond to the same object. Specifically, the determination area refers to an area including the midline of the scene in the images, and the upper edge and the lower edge of the determination area, or the left edge and the right edge of the determination area are used as the boundaries for determining entries and exits of objects. In one embodiment, assuming that the space under access control is located above or under the scene of the image and people come in and out of the space through the upper or lower side of the space, the determination area may be a rectangular area including the horizontal midline of the scene in the image, as shown in FIG. 6A. In another embodiment, assuming that the space under access control is located to the right or the left of the scene of the image, and that people come in and out of the space through the right or left side of the space, the determination area may be a rectangular area including the vertical midline of the scene in the image, as shown in FIG. 6B.

The object detection module 520 is responsible for detecting objects appeared in the images according to the image data provided by the photographic device 130. Specifically, object detection may include converting a true-color image into a grayscale image, extracting object features (e.g., positions, contours, and/or shapes, etc.) based on the grayscale image, and performing feature matching based on the extracted features to identify objects. In one embodiment, when the target objects are people and the captured images are top-view images, the contour of an object may include the top-view contour of the head and/or shoulders.

The object analysis module 530 is responsible for determining object parameters according to the detected objects. In one embodiment, when the target objects are people, the object parameters may include the positions of the centers of the heads, and the radiuses of the heads, etc.

The object in-out determination module 540 is responsible for updating the entry object count or the exit object count according to the configuration parameters received by the configuration module 510 and the object parameters determined by the object analysis module 530. Detailed descriptions of how to update the entry object count or the exit object count are provided below and accompanied by FIG. 7.

The result calculation module 550 is responsible for calculating the number of objects remaining in the space under access control (i.e., the remaining object count) according to the entry object count and the exit object count. Specifically, the remaining object count may equal to the result of subtracting the exit object count from the entry object count.

Figure 7:
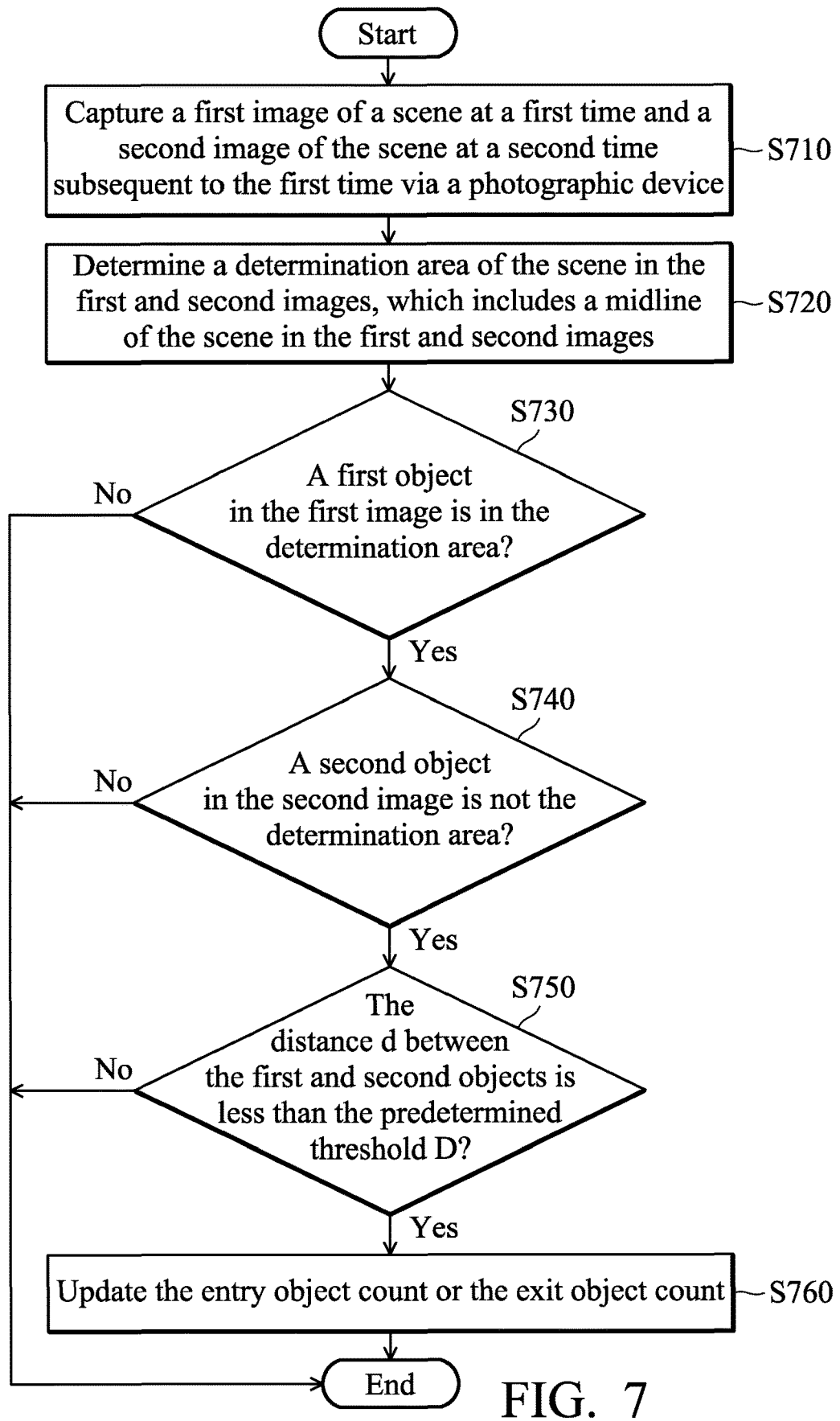
FIG. 7 is a flow chart of the image-based object tracking method according to an embodiment of the application.

FIG. 7 is a flow chart of the image-based object tracking method according to an embodiment of the application. In this embodiment, the image-based object tracking method is applied to an image-based object tracking system including a photographic device, such as the image-based object tracking system 100.

To begin with, the image-based object tracking system captures a first image of a scene at a first time and a second image of the scene at a second time subsequent to the first time via the photographic device (step S710).

In one embodiment, the frame rate of the photographic device may be configured as 30 frames per second (fps). That is, the second time may be 1/30 second later than the first time.

Subsequent to step S710, the image-based object tracking system determines a determination area of the scene in the first image and the second image, which includes a midline of the scene in the first image and the second image (step S720). For example, the determination area may be a rectangular area including the horizontal midline of the scene in the image, as shown in FIG. 6A, or the determination area may be a rectangular area including the vertical midline of the scene in the image, as shown in FIG. 6B.

Subsequent to step S720, the image-based object tracking system determines whether a first object in the first image is in the determination area (step S730), and if so, determines whether a second object in the second image is not in the determination area (step S740). Subsequent to the 'YES' branch of step S740, the image-based object tracking system overlaps the first and second images for determining whether the distance (denoted as d) between the first object in the first image and the second object in the second image is less than the predetermined threshold (denoted as D) (step S750), wherein the predetermined threshold is used to determine whether the first object and the second object correspond to the same object.

In one embodiment, the predetermined threshold may be configured according to the frame rate of the photographic device and the target objects. For example, if the frame rate of the photographic device is 30 fps and the target objects are people, the predetermined threshold may be configured as 150~200 pixels. That is, it is expected that the moving distance of a person in two consecutive images will be within the range of 150~200 pixels.

Subsequent to step S750, if the distance between the first object in the first image and the second object in the second image is less than the predetermined threshold, the image-based object tracking system updates the entry object count or the exit object count (step S760), and the method ends.

In one embodiment, assuming that the space under access control is located above the scene of the image, the update of the entry object count or the exit object count in step S760 may refer to increasing the entry object count by 1 if the second object in the second image is above the determination area (e.g., the determination area shown in FIG. 6A). Otherwise, if the second object in the second image is below the determination area, the update of the entry object count or the exit object count in step S760 may refer to increasing the exit object count by 1.

In another embodiment, assuming that the space under access control is located below the scene of the image, the update of the entry object count or the exit object count in step S760 may refer to increasing the exit object count by 1 if the second object in the second image is above the determination area (e.g., the determination area shown in FIG. 6A). Otherwise, if the second object in the second image is below the determination area, the update of the entry object count or the exit object count in step S760 may refer to increasing the entry object count by 1.

In another embodiment, assuming that the space under access control is located to the right of the scene of the image, the update of the entry object count or the exit object count in step S760 may refer to increasing the entry object count by 1 if the second object in the second image is on the right of the determination area (e.g., the determination area shown in FIG. 6B). Otherwise, if the second object in the second image is on the left of the determination area, the update of the entry object count or the exit object count in step S760 may refer to increasing the exit object count by 1.

In another embodiment, assuming that the space under access control is located to the left of the scene of the image, the update of the entry object count or the exit object count in step S760 may refer to increasing the exit object count by 1 if the second object in the second image is on the right of the determination area (e.g., the determination area shown in FIG. 6B). Otherwise, if the second object in the second image is on the left of the determination area, the update of the entry object count or the exit object count in step S760 may refer to increasing the entry object count by 1.

Figure 8:
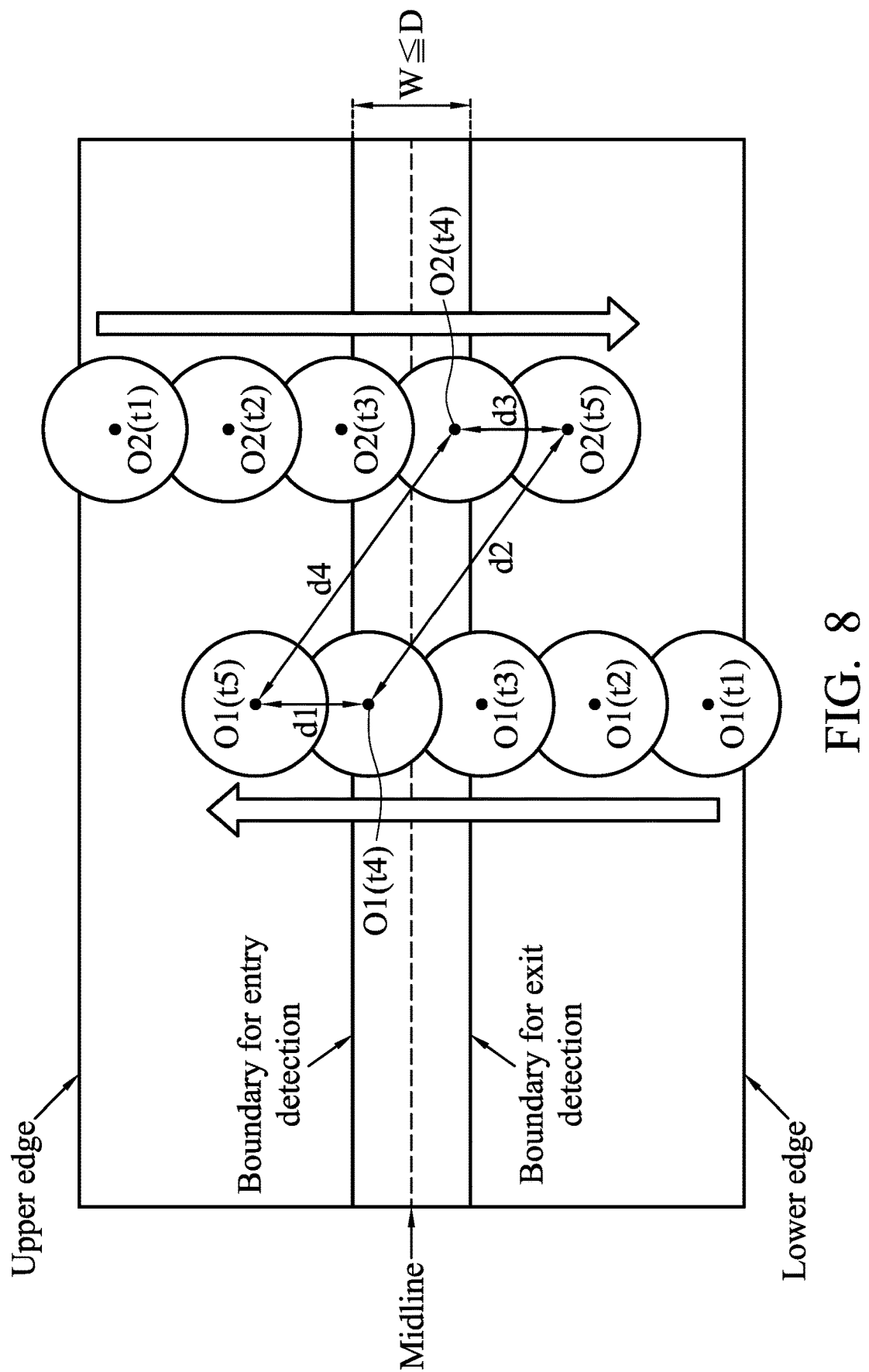
FIG. 8 is a schematic diagram illustrating the image-based object tracking according to an embodiment of the application.

FIG. 8 is a schematic diagram illustrating the image-based object tracking according to an embodiment of the application.

As shown in FIG. 8, the height of the determination area including the midline of the scene in the image is denoted as W, the upper edge of the determination area is used as the boundary for object entry determination, and the lower edge of the determination area is used as the boundary for object exit determination. The height of the determination area is less than the predetermined threshold It should be understood that the image shown in FIG. 8 is actually the overlapped image of the images at times t1~t5 for the convenience of displaying the tracks of the objects O1 and O2. Specifically, during the times t1~t5, the object O1 moves at a bottom-up direction through the determination area, wherein the positions of the object O1 at different times are denoted as O1(t1)~O1(t5). Meanwhile, during the times t1~t5, the object O2 moves at a top-down direction through the determination area, wherein the positions of the object O2 at different times are denoted as O2(t1)~O2(t5).

At time t4, the image-based object tracking system would detect that at least an object is in the determination area. At time t5, the image-based object tracking system would detect that at least an object is out of the determination area. In response, the image-based object tracking system determines whether these two objects correspond to the same object.

Specifically, regarding the object O1, the image-based object tracking system would determine that the two objects in the positions O1(t4) and O1(t5) correspond to the same object due to that the distance d1 between the two objects is less than the predetermine threshold D. In addition, the image-based object tracking system would determine that the two objects in the positions O1(t4) and O2(t5) do not correspond to the same object due to that the distance d2 between the two objects is greater than the predetermine threshold D. In response to the determination result, the image-based object tracking system would increase the entry object count by 1 due to that the object O1 has crossed the upper edge of the determination area from the time t4 to the time t5.

Regarding the object O2, the image-based object tracking system would determine that the two objects in the positions O2(t4) and O2(t5) correspond to the same object due to that the distance d3 between the two objects is less than the predetermine threshold D. In addition, the image-based object tracking system would determine that the two objects in the positions O2(t4) and O1(t5) do not correspond to the same object due to that the distance d4 between the two objects is greater than the predetermine threshold D. In response to the determination result, the image-based object tracking system would increase the exit object count by 1 due to that the object O2 has crossed the lower edge of the determination area from the time t4 to the time t5.

In view of the forgoing embodiments, it should be appreciated that, unlike the conventional design which uses the upper and lower edges of the image for object in-out determination, the image-based object tracking systems and methods of the present application are characterized by using the area including the midline of the scene in the images as the basis for counting the number of entries and exits of objects. Advantageously, miscounting of the number of entries and exits of objects may be avoided.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. An image-based object tracking system, comprising:
a photographic device, configured to capture a first image of a scene at a first time and a second image of the scene at a second time subsequent to the first time; and
a computing equipment, configured to determine an area of the scene in the first image and the second image, which comprises a midline of the scene in the first image and the second image, overlap the first image and the second image for determining whether a distance between a first object in the first image and a second object in the second image is less than a predetermined threshold in response to the first object being in the area and the second object not being in the area, and update an entry object count or an exit object count in response to the distance being less than the predetermined threshold.

2. The image-based object tracking system of claim 1, wherein the computing equipment is further configured to increase the entry object count by one in response to the distance being less than the predetermined threshold and the second object being above or to the right of the area in the second image, and increase the exit object count by one in response to the distance being less than the predetermined threshold and the second object being under or to the left of the area in the second image.

3. The image-based object tracking system of claim 1, wherein the computing equipment is further configured to increase the exit object count by one in response to the distance being less than the predetermined threshold and the second object being above or to the right of the area in the second image, and increase the entry object count by one in response to the distance being less than the predetermined threshold and the second object being under or to the left of the area in the second image.

4. The image-based object tracking system of claim 1, wherein the area has a height or width that is less than the predetermined threshold.

5. The image-based object tracking system of claim 1, wherein the computing equipment is further configured to determine a remaining object count according to the entry object count and the exit object count.

6. An image-based object tracking method, executed by an image object tracking system comprising a photographic device, the image object tracking method comprising:
capturing a first image of a scene at a first time and a second image of the scene at a second time subsequent to the first time via the photographic device;
determining an area of the scene in the first image and the second image, which comprises a midline of the scene in the first image and the second image;
overlapping the first image and the second image for determining whether a distance between a first object in the first image and a second object in the second image is less than a predetermined threshold in response to the first object being in the area and the second object not being in the area; and
updating an entry object count or an exit object count in response to the distance being less than the predetermined threshold.

7. The image-based object tracking method of claim 6, further comprising:
increasing the entry object count by one in response to the distance being less than the predetermined threshold and the second object being above or to the right of the area in the second image; and
increasing the exit object count by one in response to the distance being less than the predetermined threshold and the second object being under or to the left of the area in the second image.

8. The image-based object tracking method of claim 6, further comprising:
increasing the exit object count by one in response to the distance being less than the predetermined threshold and the second object being above or to the right of the area in the second image; and
increasing the entry object count by one in response to the distance being less than the predetermined threshold and the second object being under or to the left of the area in the second image.

9. The image-based object tracking method of claim 6, wherein the area has a height or width that is less than the predetermined threshold.

10. The image-based object tracking method of claim 6, further comprising:
determining a remaining object count according to the entry object count and the exit object count.

* * * * *